United States Patent [19]
Haas et al.

[11] Patent Number: 5,954,175
[45] Date of Patent: Sep. 21, 1999

[54] MODULARIZED PARALLEL DRIVETRAIN

[75] Inventors: Edwin G. Haas, Savville; Edward V. Sullivan, Huntingdon Station; Robert C. Schwarz, Huntington; Martin Kesselman, Commack, all of N.Y.; Gary E. Kuhn, Arlington, Tex.; John M. Papazian, Great Neck, N.Y.

[73] Assignee: Northrop Grumman Corporation, Los Angeles, Calif.

[21] Appl. No.: 08/921,823

[22] Filed: Sep. 2, 1997

[51] Int. Cl.[6] ............................. F16D 27/00; B21D 37/02; B21D 37/14

[52] U.S. Cl. ......................... 192/48.2; 33/561.3; 72/413; 74/665 F

[58] Field of Search .............................. 72/413; 33/561.3, 33/561.1; 192/48.2, 84.2, 84.21; 74/665 F; 269/266; 425/175, 356, 398

[56] References Cited

U.S. PATENT DOCUMENTS

| | | |
|---|---|---|
| 114,328 | 5/1871 | Nutter . |
| 491,074 | 1/1990 | Richards . |
| 1,141,640 | 6/1915 | Huguenin . |
| 1,595,916 | 8/1926 | Zetina et al. . |
| 2,280,359 | 4/1942 | Trudell ..................................... 113/44 |
| 2,632,336 | 3/1953 | Luketa ...................................... 74/472 |
| 2,668,999 | 2/1954 | Baechler ................................... 25/121 |
| 3,188,077 | 6/1965 | Olson ....................................... 269/226 |
| 3,698,265 | 10/1972 | Williams .............................. 74/665 GA |
| 3,946,492 | 3/1976 | DuBose, Jr. ............................ 33/169 R |
| 4,212,188 | 7/1980 | Pinson ......................................... 72/413 |
| 4,221,053 | 9/1980 | Bobel, II et al. ....................... 33/173 L |
| 4,241,509 | 12/1980 | Possati ................................. 33/174 PA |
| 4,398,693 | 8/1983 | Hahn et al. .............................. 249/155 |
| 4,400,884 | 8/1983 | Baresh et al. ....................... 33/174 PA |
| 4,412,799 | 11/1983 | Gates ....................................... 425/150 |
| 4,472,846 | 9/1984 | Volk et al. ......................... 192/48.2 X |
| 4,527,783 | 7/1985 | Collora et al. ............................. 269/21 |
| 4,684,113 | 8/1987 | Douglas et al. ........................... 269/21 |
| 4,691,905 | 9/1987 | Tamura et al. ............................ 269/45 |
| 5,009,296 | 4/1991 | Ohkawa et al. ................... 192/48.2 X |
| 5,187,969 | 2/1993 | Morita ..................................... 782/413 |
| 5,192,560 | 3/1993 | Umetsu et al. ......................... 425/175 |
| 5,364,083 | 11/1994 | Ross et al. ................................. 269/21 |
| 5,470,590 | 11/1995 | Brubaker et al. .......................... 452/2 |
| 5,546,313 | 8/1996 | Masters ............................. 364/468.03 |
| 5,546,784 | 8/1996 | Haas et al. ................................ 72/413 |

*Primary Examiner*—Rodney H. Bonck
*Attorney, Agent, or Firm*—Terry J. Anderson; Karl J. Hoch, Jr.

[57] ABSTRACT

The invention resides in a module used in conjunction with other such modules in an apparatus for rapidly producing an article having a three-dimensional design comprising a base, a plurality of translating members mounted on the base and the plurality of translating members movable relative thereto, the base is an interconnectable block of parallel drivetrain elements having a single input shaft and a series of parallel output shafts at right angles to the input shaft whose power flow to the output shafts is connected/disconnected electrically via electromagnetic clutches.

10 Claims, 2 Drawing Sheets

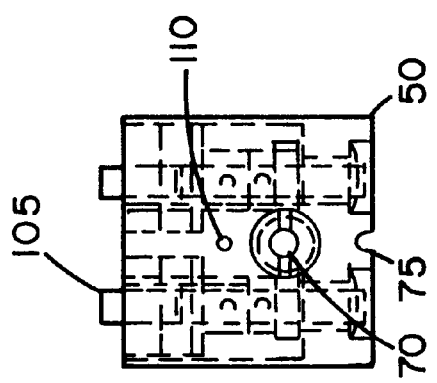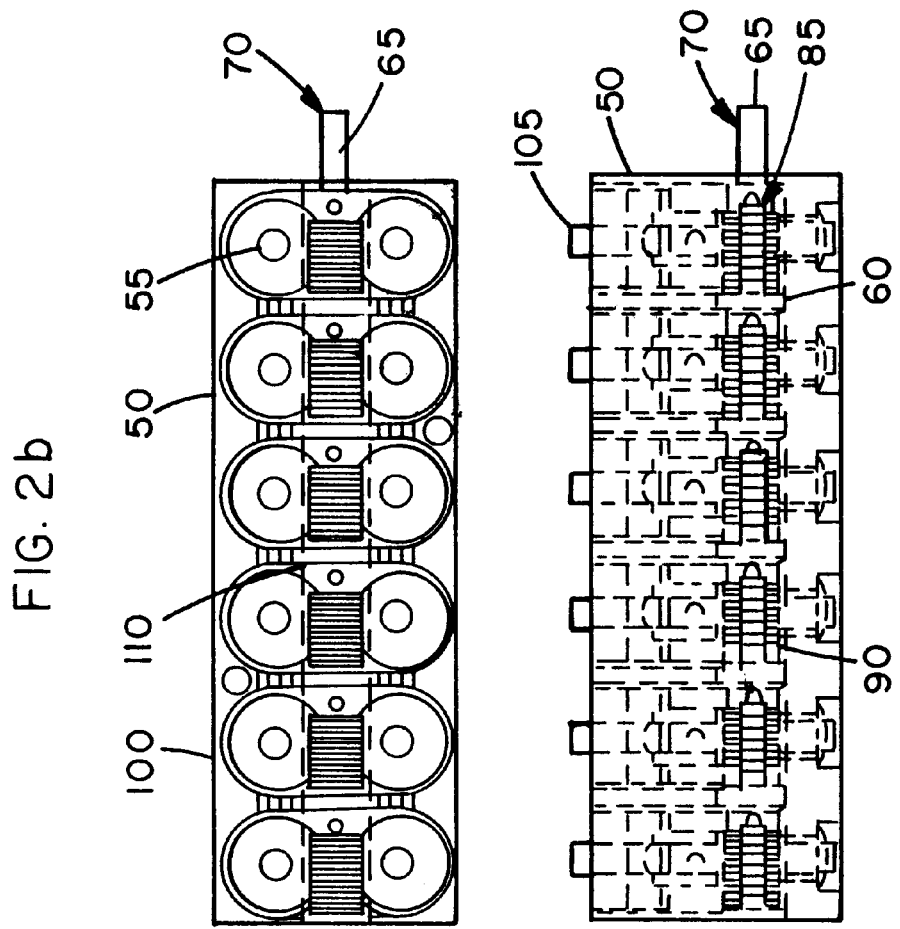

MODULARIZED PARALLEL DRIVETRAIN

This application relates to copending U.S. application Ser. No. 08/903,476 entitled "INDIVIDUAL MOTOR PIN MODULE" filed Jul. 30, 1997, and to copending U.S. application Ser. No. 09/044,816, filed Mar. 20, 1996 and entitled "MODULARIZED ADJUSTABLE HOLDING FIXTURE".

BACKGROUND OF THE INVENTION

The present invention relates to a computer controlled tool capable of providing an adjustable 3-D surface for forming, for example, sheet material to provide rapid contour changes thereto, and relates more particularly to the mechanism by which such rapid contour changes are made wherein the mechanism is comprised of a plurality of assembled modules which act in concert with one another to effect the work operation.

Large discrete contour tools composed of rotating shafts and translating members encounter problems in assembly, wiring, tolerance build-up, and servicing. Additionally, the risk involved with machining tool bases and housings from solid material increases with the number of parallel shafts required for adjustment. The amount of machining necessary for these tools is also substantial. This causes high tool costs due to the large expenditures required to buy metal stock, then subsequently remove large volumes of metal during machining operations. Further, offline repairs, servicing, and maintenance are desirable features and if made possible, allow minimum down-time by rapidly replacing complete modules with acceptable spares in stock. Such tools however have many applications in the aerospace industry and in other industries which need to hold, form, or inspect contoured components.

Additionally, the fabrication risks involved with machining tool bases and housings from solid material increases with the number of cells, bosses, and/or pockets required for motors, translating and/or rotating components. The amount of machining necessary for large tools can often be substantial. This causes tool costs to be very high due to the large expenditures required for buying or casting metal stock, then subsequently machining away the large volumes of metal needed assure proper fit of all assembled components. Thus, the concept of "modularity" is thus not provided for in such prior art machines, such as disclosed in U.S. Pat. No. 5,546,784. No "building block" approach is found, and thus no low-cost, high quality castings, forgings, or common machinings for component housings and/or bases are used in the prior art.

Also, the use of traditional control systems for positioning a large array of individual motors require substantial amounts of wiring in very limited space. Large form tools traditionally have had a preset maximum active tool area (maximum usable length and width). The inflexible limiting nature of the plan form (length and width of the active area) is a problem which could be alleviated by using a modular system wherein only a foot print necessary to effect the job at hand need be fabricated. In addition, the cost for an adjustable tool is high relative to the cost for a single fixed-contour tool. The economic viability of replacing many fixed-contour tools by a single adjustable-contour tool depends upon the number of fixed tools that a single adjustable tool can replace.

Accordingly it is an object of the invention to provide an assembly wherein the overall initial system cost is lower and a major advantage when building large form tools.

A further object of the invention is to provide an interconnectable, self-contained module that forms the building block of a two-dimensional array of greater plan dimensions than the one module.

Still a further object of the present invention is to provide a tool wherein individual modules are used and provide building blocks when put together thereby lowering the overall cost of the tool and simplifying external wiring, assembly, and machining operations.

A further object of the invention resides in an interconnectable self-contained "module" as described above whereby the input shaft of one module can connect to the input shaft of a similar adjacent module thus enabling a row of modules to be powered along a common input shaft axis.

Yet still a further object of the invention is to provide an assembly with an inherently lower overall risk of fabrication breakage thereby reducing the magnitude of errors which can cause scrap when creating larger-scale tooling versus large one-piece housings.

A further object of the invention is to provide a means for using similar, repetitive components which lend themselves by design to high volume production methods, thus lowering overall fabrication costs, such as for example, investment or die casting of components (i.e. the module base) could reduce machining costs and material costs simultaneously.

Still a further object of the invention is to provide an assembly of the aforementioned type which provides easier servicing, component replacement, and less down time and to provide such an assembly with quick-disconnect electrical plugs so that module replacement can be accomplished with minimum down time.

Further still an object of the invention is to provide an assembly of the aforementioned type which allows the plan form of an adjustable form tool to be changed inexpensively, rapidly to different length/width combinations by adding or subtracting modules to an oversize base plate.

Still another object of the invention is to provide an assembly of the aforementioned type which allows for offline repairs, servicing, and maintenance further allowing minimum down-time by rapidly replacing complete modules with acceptable spares in stock.

SUMMARY OF THE INVENTION

The invention resides in a module adapted to be used in conjunction with other such modules in an apparatus for rapidly producing an article having a three-dimensional design comprising a module base, a plurality of pins movably mounted relative to the base and being movable relative thereto, a plurality of drive output shafts each associated for driving connection with one the plurality of pins, transmission means disposed in the base for independent driving controllable interconnection of each of the plurality of pins with a common rotational drive source, and control means interconnecting the transmission means and a controller with one another to effect selective energization of transmission means to effect selective rotation of one or more of the plurality of pins.

BRIEF DESCRIPTION OF THE DRAWINGS

FIG. 2a is a side elevation view of the module base.

FIG. 2b is a top view of the module base.

FIG. 2c is an end view of the module base.

DESCRIPTION OF THE PREFERRED EMBODIMENT

Figure 1:
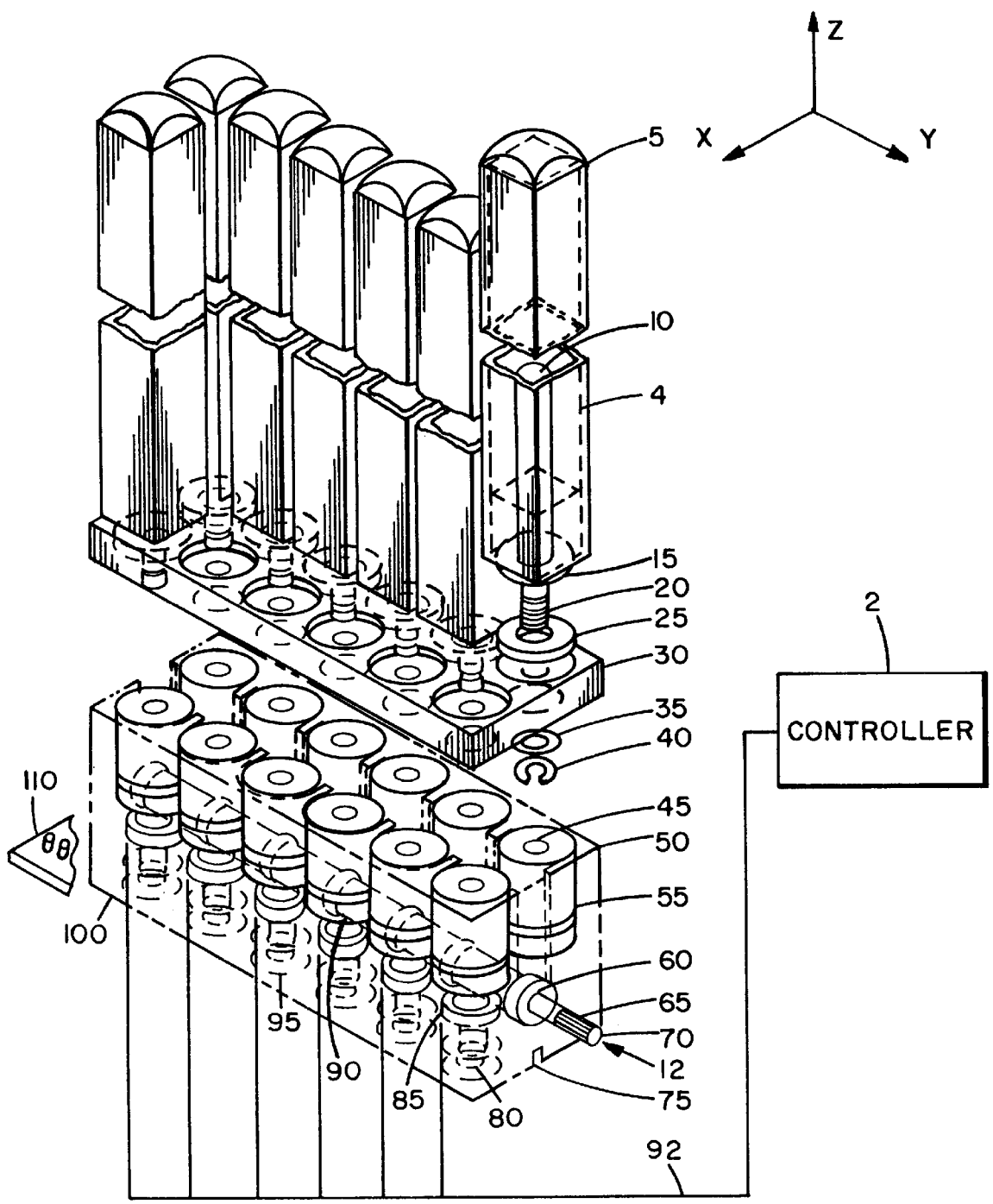
FIG. 1 is a perspective view of the module of the invention.

This describes an apparatus and a method of building large parallel translating-member devices using a modularized building-block approach of adding or subtracting common modules containing a individually-addressable clutch drives. As used herein, the term, "modularity", as applied involves using a building block approach of combining many similar or identical blocks of parallel drivetrain elements having more than one row and/or more than one column of evenly spaced parallel outputs shafts. The concept of "modularity" is needed for discrete tools to allow taking a "building block" approach, and to make use of low-cost, high quality castings feasible for geartrain housings and bases. For the purposes of this discussion, it should be seen that a module is referenced as numeral 100 and is to be understood as being a unit which is capable of being drivingly connected in a quick disconnect manner to a common drive output source to effect multiple different translations from a common drive source.

Referring to FIG. 1, a perspective break-away view of a single "building block" module is shown embodying the invention. The module includes a plurality of translating members or pins 5 mounted for movement on a cap plate 30. The cap plate 30 is in turn adapted for mounting to a module base 50 which itself is located at the bottom of a frame (not shown) in a manner which will become apparent later. Each pin 5 is defined by an elongated shank 4, with each pin 5 having internal threads which are correspondingly sized and shaped to mate with a respective lead screw 10 associated with the pin 5.

The lead screws 10 are all parallel and may have threaded components or gears attached to translate rotary motion of the lead screws 10 into linear motion. The lower end of each lead screw 10 includes a drive connector 20. The translating member or pin 5 is shown for illustration only, however one skilled in the art should recognize that various output connections can be made to the lead screws. If linear motion in the same direction from all shafts simultaneously is desired, alternate columns of translating components or pins 5 may have opposite hand threads (or teeth) so that all of the parallel lead screws 10 can impart translation in the same direction if desired.

The pins 5 are prevented from rotating by the restraining action of the planar sides of the outermost pins against the inside of the tooling frame. The innermost pins bank against each other to prevent rotation. It is noted that the pins 5 can be square, rectangular or hexagonal in cross section, or can be semiround with flats manufactured thereon. The torque from the drive motor therefore translates each pin a distance proportional to the amount of drive motor shaft rotation.

Additionally, the pins 5 may be partly or fully threaded internally and may be made from bored solid block of metal stock, or alternatively, the pins 5 may be made from hollow tubes. In the case where the pins 5 are made from hollow tubes, threaded nuts or couplings are secured to the end of the pin shank 4 in lieu of formed internal threads.

The pins 5 are translated by the lead screws 10 in the indicated Z axis direction when the lead screws are rotated by a drive motor (not shown) in accordance with the invention. Rotation of the lead screws from the motor is accomplished through the intermediary of a transmission means 12. The means 12 includes an input shaft 65 and drive coupling means 70 attached thereto, an input clutch drive gear 90 nonrotatably and concentrically disposed about the input shaft 65 and a plurality of clutch assemblies 55 each having a clutch drive gear 80 rotatably disposed in journalling openings formed in the module base 50 and is associated with the drive input side of the assembly and a clutch output port 45 associated with the drive output side of each clutch assembly.

Each clutch assembly has an associated upper end which controllably drivingly connects with one of the individually mounted lead screw drive connectors 20 disposed on the lower ends of each of the lead screws 10. The lower ends of each of the screw drive connectors 20 is splined and is correspondingly sized and shaped so as to be received within the correspondingly sized splined port 45 in a corresponding one of the clutch assemblies 55. The drive connectors are maintained against axial movement on the cap plate 30 by a washer and C-clip assembly disposed about the base thereof. Each clutch assembly is driven in rotation by its associated clutch drive gear 80 which is in turn driven by the common input shaft 65.

As previously discussed, an external drive motor is provided and is drivingly connected to the input shaft 65 through the intermediary of the drive coupling means 70. The input shaft 65 is driven by the external motor (not shown) and is supported in the module base 50 using bearings 60. Each bearing 60 is secured using bearing retainer 110 which is in turn captured by cap plate 30. The drive motor which is used is also connected to a controller 2 which is responsible for driving the clutch in either rotational direction or for causing the clutch to stop. Either one motor per module base 50 can be used to drive the module input shaft(s) 65, or a cross shaft (not shown) can be used to drive multiple parallel modules via one or more external motors. The motor(s) may or may not have associated gear reduction gearbox(es), depending upon the required lead screw 10 speed (and/or material) and input shaft drive gear ratios 90, 85.

Power is transmitted from the input shaft 65 to each clutch assembly 55 via a 90 degree change in power flow from the input shaft 65. This is accomplished through the use of perpendicularly disposed gear teeth on juxtaposed portions of the input shaft clutch drive gear 90 and corresponding one's of the clutch drive gears 85. That is, the gear teeth formed on each of the clutch drive gears 85 as best seen in FIGS. 2a–2c are in a generally vertical orientation while corresponding portions of the gearing 90 on the input shaft 65 extend thereabout in a generally spiral manner. This permits continual driving of the input side of the clutch assembly 55 during drive motor rotation. The input shaft 65 is supported by bearings 60 which can withstand both radial and axial thrust forces. The bearings 60 are retained by bearing retainers (110) which also can withstand both axial and radial forces.

Each clutch assembly 55 includes a means (preferably electromechanical) for controlling the on and off rotational conditions of the drive side of the clutch assembly associated with the lead screws 10. This means includes a series of lines 92 which connect the controller 2 with each clutch assembly through each module center or bottom base plate. Each clutch assembly 55, when deactivated, will not transmit rotary motion to the clutch output port 45. Each clutch assembly must be activated by a timed electric signal which connects the flow of power from the clutch drive gear 85, through the clutch assembly (55), to the clutch output shaft 105 and to lead screw 10. A control system capable of applying these timed signals can be used with either centralized or distributed logic.

The control system (shown schematically) may operate using either open-loop (no feedback) or closed loop mode, that is, if (optional) rotary encoders are connected to the clutch output shafts 105.

Once assembled, each module is inserted into the completed form tool frame (not shown). Each module is located via a locating means, e.g. locating pins on the frame, which are received into a keyway 75 in the module base 50 for enclosing an array of module assemblies. In this way, the configuration of the tool can be changed rapidly to different length/width combinations by adding or subtracting module assemblies to the oversized frame base plate 111. The pitch of the lead screw 110 is chosen so that the pins 5 are self-locking when compressively loaded. Forming loads are transferred from the pin 5 to the lead screw 10 and then from the lead screw to the module base 50. Each module 100 is adapted to be inserted into a frame (not shown) of the type which is disclosed for example in U.S. Pat. No. 5,546,313. The assembled modularized parallel drivetrains 100 can be connected to one another in series by using quick disconnects between two connected co-linear input shafts 65. The modules 100 therefore can be placed side by side, front-to-back, or both. Thus, an interconnected, self-contained "module" as described above with plan dimensions smaller than the active reconfigurable tool area which can comprise a larger reconfigurable tool that can rapidly configure a series of translating pins (via parallel rotating shafts) to form a three-dimensionally contoured external surface.

Using the modularized parallel drivetrain as a building block, many devices become more feasible including adjustable form dies, adjustable checking fixtures, adjustable contour fixtures, adjustable inspection fixtures, and other adjustable form tools. As an example, discrete reconfigurable dies for forming sheet metal become more feasible. While it has been stated that such discrete, adjustable tools have many applications in the aerospace industry, other industries that need to hold, form, or inspect contoured components can benefit from the described "modular" approach as well. For example, the modular approach can also be used to translate a series of sensors for rapidly digitizing the surface(s) of a contoured part or component. The digitized data can be directly stored in computer memory for a three-dimensional surface description which can be used by a computer-graphic or numerical control software application.

In summary, the use of modules for building large assemblies further helps alleviate the problem of handling large quantities of wires in limited space. Greater versatility can be achieved by allowing overall tool size changes inexpensively. The overall plan form (length and width) dimensions can be changed when using modules as building block units for form tools. Modules can easily be added or subtracted within the limitations allowed by the overall form tool base plate. Framing members (if used) around the entire assembly may have to be changed, but their cost would be low compared to replacement of an entire form tool for differing plan form (overall length and width) requirements. The use of the modular arrays allows for isolation and rapidly replacement of malfunctioning elements by replacing entire modules with spare modules. Further repairs can then be implemented off-line. This minimizes down time, and replacement cost. The ability to reconfigure the plan form of an entire assembly of modules by adding or subtracting modules gives a high degree of versatility to the tool.

By the foregoing, an improved tool has been described by way of the preferred embodiment. However, numerous modifications and substitutions may be had without departing from the spirit of the invention. For example, the modules can be used to translate a series of sensors for rapidly digitizing the surface (or surfaces) of a contoured part or component. The digitized data can be directly stored in computer memory for a three-dimensional surface description which can be used by a computer-graphic or numerical control software application. Also, it should be understood that the invention resides in a method of building large parallel geartrain devices by using a modularized building-block approach of adding (or subtracting) common modules containing a smaller quantity of evenly-spaced parallel driven shafts. A description of one module is described herein above and follows with suggested methods of linking modules, in series, if desired.

Accordingly, the invention has been described by way of illustration rather than limitation.

What is claimed is:

1. An apparatus defined by a plurality of translating members, comprising:

a frame base plate;

a plurality of module bases capable of being assembled as a reconfigurable tool area defined by an array of said modular bases on said base plate;

each of said modular bases being formed with a portion capable of coacting with corresponding locating portions of said base plate;

a plurality of translating members movably mounted to said modular bases and being movable relative thereto;

a plurality of drive output shafts each associated for driving connection with one said plurality of translating members;

transmission means disposed in said base modules for independent driving controllable interconnection of each of said plurality of translating members with a common rotational drive source; and control means interconnecting said transmission means and a controller with one another to effect selective energization of said transmission means to effect selective rotation of one or more of said plurality of translating members.

2. The apparatus of claim 1 wherein said translating members have planar sides and are prevented from rotating by the restraining action of the planar sides of said translating members.

3. The apparatus of claim 2 wherein a means for interconnecting each of said plurality of translating members with an associated one of said drive output shafts includes a lead screw.

4. The apparatus of claim 3 wherein said transmission means includes a plurality of clutch assemblies and an input shaft and drive coupling means attached thereto, and an input clutch drive gear nonrotatably and concentrically disposed about the input shaft and said plurality of clutch assemblies each having a clutch drive gear rotatably disposed in journalling openings formed in the module base and being driving connected to said input clutch drive gear.

5. The apparatus of claim 4 wherein each of said clutch drive gears being disposed orthogonally to said input clutch drive gear.

6. The apparatus of claim 5 wherein each clutch assembly has an associated upper end which drivingly connects with a lead screw drive connector disposed on the lower ends of each of the lead screws.

7. The apparatus of claim 6 wherein lower ends of each of the screw drive connectors are splined and are correspondingly sized and shaped so as to be received within a correspondingly sized splined opening in a corresponding one of the clutch assemblies.

8. The apparatus of claim 7 wherein each translating member is defined by an elongated shank, with each translating member having internal threads which are correspondingly sized and shaped to mate with a respective lead screw associated with the associated translating member.

9. The apparatus of claim 8 wherein each clutch assembly is connected to a common controller.

10. A method of building large parallel geartrain devices by using a modularized building-block approach of adding or subtracting common modules as defined in claim 1 and linking modules in series.

* * * * *